United States Patent [19]

Glick

[11] Patent Number: 5,620,325
[45] Date of Patent: Apr. 15, 1997

[54] EDUCATIONAL BLOCKS WITH ENHANCED MANIPULATION FEATURES

[76] Inventor: Eileen M. Glick, 1085 Warburton Ave, Hastings-On-Hudson, N.Y. 10706

[21] Appl. No.: 513,401

[22] Filed: Aug. 10, 1995

[51] Int. Cl.⁶ .............................. G09B 19/10; A63H 33/04
[52] U.S. Cl. .............................. 434/258; 446/85; 446/901
[58] Field of Search .................................. 434/258, 259; 446/85, 110, 126, 901, 124

[56] References Cited

U.S. PATENT DOCUMENTS

| | | | |
|---|---|---|---|
| 2,659,163 | 11/1953 | Albee | 434/259 |
| 2,774,250 | 12/1956 | Genin | 434/259 |
| 3,374,917 | 3/1968 | Troy | 446/125 |
| 3,479,751 | 11/1969 | Welbourn | 434/259 |
| 3,655,201 | 4/1972 | Nichols | 446/125 |
| 3,659,360 | 5/1972 | Zeischegg | 446/85 |
| 4,026,087 | 5/1977 | White | 446/125 |
| 4,437,668 | 3/1984 | Simpson et al. | 434/259 |
| 4,610,631 | 9/1986 | Ferguson | 434/259 |
| 4,667,962 | 5/1987 | Ishiyama | 446/35 |
| 4,698,023 | 10/1987 | Marino | 434/209 |
| 4,952,153 | 8/1990 | McAllister | 434/259 |
| 4,995,813 | 2/1991 | Francioni | 434/259 |
| 5,009,625 | 4/1991 | Longuet-Higgins | 446/35 |
| 5,030,158 | 7/1991 | Gal et al. | 446/219 |
| 5,139,453 | 8/1992 | Aiken et al. | 434/259 |
| 5,154,656 | 10/1992 | Milstein | 434/259 |
| 5,340,349 | 8/1994 | Berg-Fernstrum | 446/901 |
| 5,458,522 | 10/1995 | Brooks, III | 446/901 |

FOREIGN PATENT DOCUMENTS

| | | | |
|---|---|---|---|
| 1300206 | 6/1962 | France | 446/901 |
| 2082925 | 3/1982 | United Kingdom | 446/901 |

*Primary Examiner*—Paul J. Hirsch
*Attorney, Agent, or Firm*—Patterson & Keough, P.A.

[57] ABSTRACT

The invention discloses an educational block having a frame member portion with a thickness appropriate for grasping, and a translucent window portion, the edge of which cooperates with the inner surface of portions of the frame member portion.

15 Claims, 2 Drawing Sheets

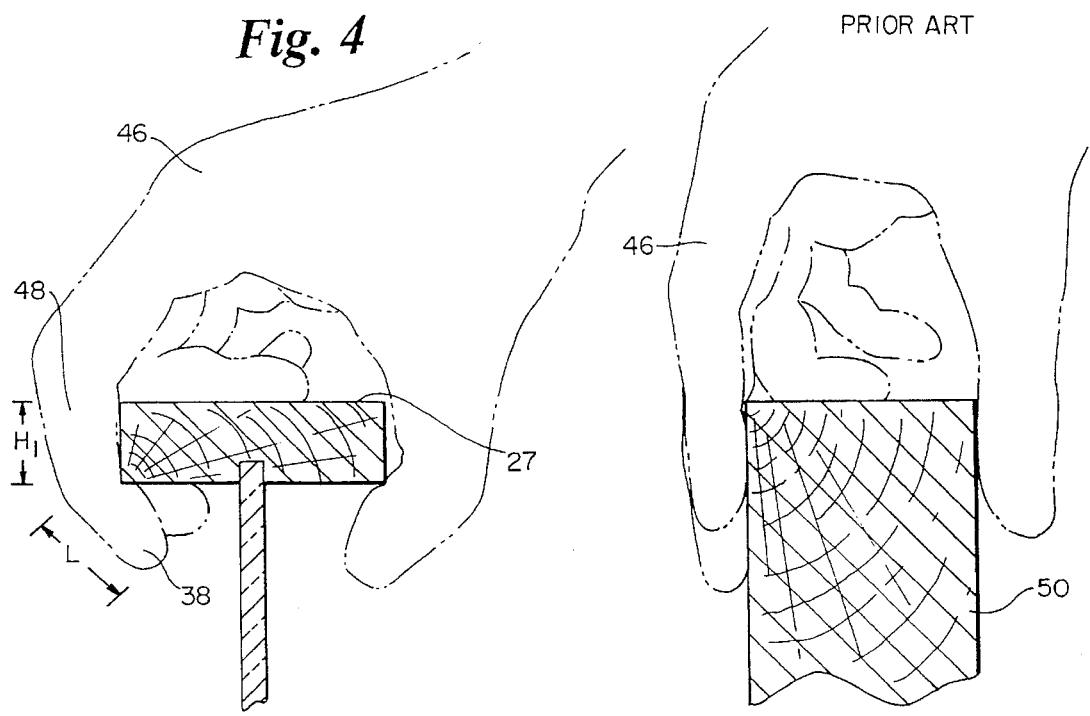
Fig. 4
Fig. 5 PRIOR ART
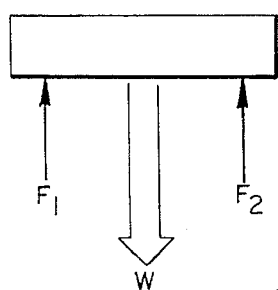
Fig. 6
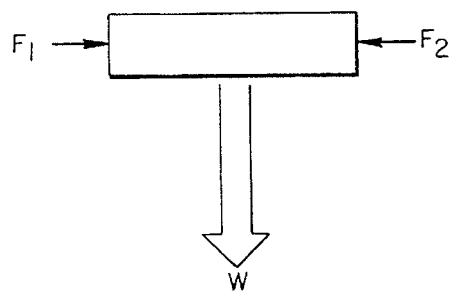
Fig. 7
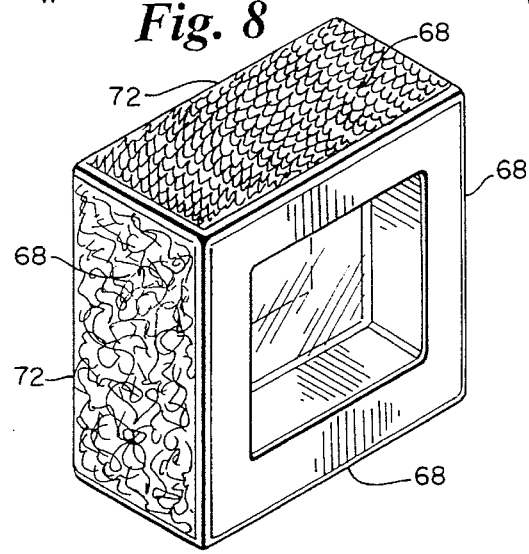
Fig. 8
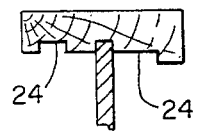
Fig. 9

EDUCATIONAL BLOCKS WITH ENHANCED MANIPULATION FEATURES

FIELD OF THE INVENTION

This invention relates generally to educational blocks and more specifically to blocks for use by persons with reduced motor skills.

BACKGROUND OF THE INVENTION

Toy blocks are known to facilitate children's interest in geometric shapes and encourage creative uses of those shapes such as stacking and handling in various ways. Toys and other articles having translucent sections are also known. For example, U.S. Design Patent No. 336,961 (Carlson, et al) shows a triangular translucent block likely useful as a construction article in the building trades. Also, U.S. Pat. No. 5,102,706 (Latte) relates to the preparation of stained glass assemblies in either two-dimensional or three-dimensional composites. The patent discloses a process for assembling pieces of glass of different colors to create final integral designs. U.S. Pat. No. 3,420,730 (Ellefson) discloses a method of making stained glass windows. The reference teaches using colored panels of various shapes and sizes, and has as its purpose the creation of a final artistic device. U.S. Pat. No. 3,014,302 (Hughes) discloses an invention which relates to abstract art devices and more particularly to an apparatus for forming non-representational designs of various configurations.

U.S. Pat. No. 5,030,158 (Gal, et al) discloses an optical construction toy assembly which allows the user to create different optical devices. U.S. Pat. No. 4,643,683 (Orsini, et al) discloses a set of blocks which contain, integral to each block, a window through which various indicia can be observed by the person using the blocks, although the window does not extend through the block. U.S. Pat. No. 3,947,992 (Lemelson) discloses a molding toy which provides different compartments so that the person using the toy can put materials of different colors in the compartments, thus creating a work of art. The reference teaches use of casting material of various colors. U.S. Pat. No. 1,430,557 (Jervis) discloses opaque children's blocks of various geometric shapes which may be put together in a variety of configurations.

SUMMARY OF THE INVENTION

The invention provides a set of blocks of various geometric shapes which include convenient gripping surface configurations for the manipulation of the blocks during play, especially by children. The invention also provides a set of blocks that include, integral to the blocks, translucent panels of various colors. The colored panels provide both aesthetic and instructional benefits to the users of the blocks. The colored panels, in combination, provide an educational experience for the user relating to the interaction of light and color. Other objects of the invention include inviting imaginative play and promoting expressive language, helping to develop problem solving skills, and helping to develop eye-hand coordination.

BRIEF DESCRIPTION OF THE DRAWINGS

FIG. 4 shows a hand grasping a sectioned block cut along lines 4—4 of FIG. 2.

FIG. 5 shows a hand grasping a sectioned conventional solid block cut along lines 5—5 of FIG. 3.

FIG. 6 is a free-body diagram of forces exerted on a frame member of a block of the present invention.

FIG. 7 is a free-body diagram of forces exerted on an outer wall portion of a prior art block.

FIG. 8 is a perspective view of an embodiment of the invention with hook and loop surface features on outer portions of the frame member.

FIG. 9 is a section view of a representative groove and lip incorporated into portions of a block frame member.

These figures, which are idealized, are not to scale and are intended to be merely illustrative and non-limiting.

DETAILED DESCRIPTION OF THE INVENTION

Numerous designs for children's blocks exist, as well as blocks more appropriate for construction uses. However, no block design has adequately addressed specific challenges experienced by users with greater than normal physical motor skill deficiency.

The invention provides a variety of blocks to be used in play which are specifically designed to overcome such block design omissions. In particular, one embodiment of the blocks is to be used by children in order to educate them concerning various geometric shapes and colors. However, the present invention generally provides physically challenged individuals with the opportunity to explore the joys of placing blocks in various and creative configurations, thus displaying the geometric interaction of the blocks and the aesthetic interaction of the colors. It is recognized that the joy of use, and therefore popularity of such a block or blocks, may also afford pleasure to users of normal physical capabilities.

Figure 1:
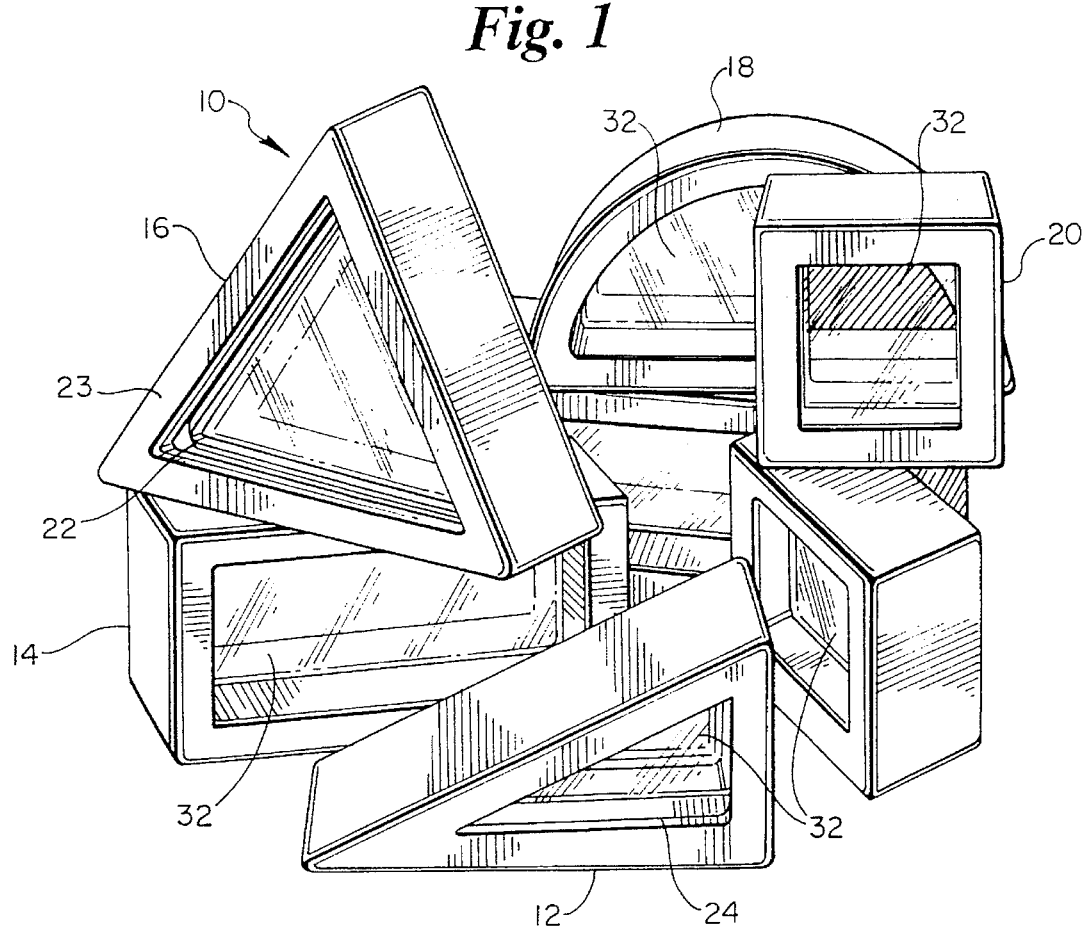
FIG. 1 is a perspective view of a set of blocks arranged at various angles.

FIG. 1 is a partial perspective view of an assembly of blocks 10 representative of those comprising the present invention. The blocks are of various shapes, for example including a right triangular block 12, a rectangular block 14, an equilateral triangular block 16, a semi-circular block 18, and a square block 20. Optionally, the dimension of each block is a multiple of a comparable dimension in conventional blocks with which these new blocks might be combined by a user. In this Figure, each block shows means for enhancing the grip of a user onto the block. For example, each block has a recessed or ledge portion, discussed further below. Also, in this Figure, blocks 16 and 12 each further comprise additional means for enhancing gripping. Block 16 includes a groove 22 on the inside of the frame member 23, and block 12 has a lip 24; one example of each embodiment being shown in greater detail in FIG. 9.

Figure 2:
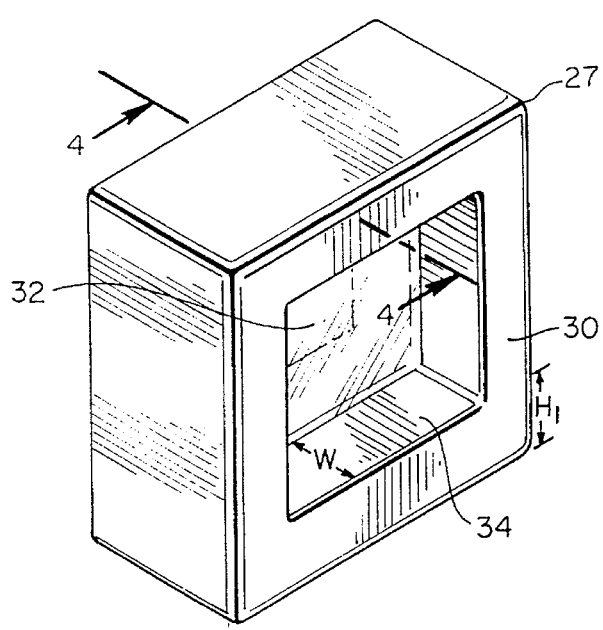
FIG. 2 is a perspective view of a block.

FIG. 2 illustrates a block 27 representative of one embodiment of a block of this invention, shown in similar shape to block 20 in FIG. 1. Preferably, each block is comprised of a frame member 30 and a translucent element 32. Frame member 30 may comprise one or more portions arranged circumferentially around translucent element 32. Preferably, translucent element 32 is recessed from the outer dimension of each block as described further below. In addition, using various embodiments, frame member 30 provides a gripping surface so that the block can be readily manipulated by a user. This aspect of the invention recognizes and overcomes the profound frustration of user's of normal blocks who have certain physical limitations. Such limitations may include motor skill deficiencies attributable to age or other reasons. Often, such users of conventional blocks experience serious inabilities to simply grasp a block with their hands. Indeed, this type of user may need to employ elbows or other body portions, or even portions of a prosthesis, to manipulate a block. This has led many users, and educators or guardians, to avoid using conventional blocks in order to prevent frustration and the attendant challenges to self-esteem and user confidence. However, the use of a block according to the various embodiments of this invention greatly obviates these concerns. This results in the blocks being used by physically challenged individuals to greater advantage and with more positive outcome. Indeed, with the advantages of this invention, the use of blocks becomes educational, fun, and rewarding among users previously unaccustomed to such basic human delight.

FIG. 2 illustrates block 27 having a basic configuration of a ledge or recess 34 which greatly enhances the ability of a user to grip the block. A preferred ledge may have a width, W, which is sized to accommodate and optimize gripping by a user. For example, width W of block 27 may be sized to receive a length L of the user's distal phalanx portion 38 of a hand 46, as shown in FIG. 4. When ledge 34 is provided on two sides of a block, the user's ability to manipulate the block is further enhanced. In similar manner, block 27 may also be sized with a ledge height $H_1$ optimized for gripping by a user's middle phalanx portion 48 of a finger, as shown in FIG. 4. The ledge sizing configurations are quite useful in enhancing the overall ability of a user to grip a block. However, even greater enhancement is achievable with various additional means described below.

Figure 3:
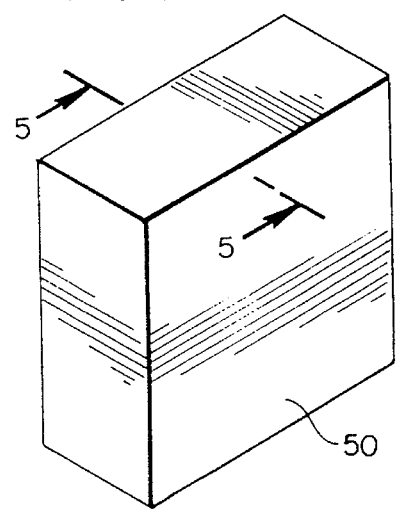
FIG. 3 is a perspective view of a prior art block.

FIG. 3 is a perspective view of a common solid block 50 which does not have the enhanced gripping features of this invention. The design of block 50 fails to recognize or solve many of the ergonomic and physiological impediments to utility that the block presents to those users having motor skill challenges as described above. FIG. 5 illustrates how a user would normally attempt to pick up a block of a conventional style, such as block 50 in FIG. 3. The block in FIGS. 3 and 5 is a solid block, which does not supply any convenient gripping surface suitable to enhance its utility for users needing such enhancement.

FIG. 6 shows a free body diagram illustrating the different forces $F_1$, $F_2$ that are at work on a frame member of the block of the present invention, as shown representatively in FIG. 4. Forces are exerted in a vertical manner underneath a given frame member by body members or extensions thereof, such as distal elements of the fingers of a hand, while the weight vector is shown going in the opposite direction. Such a configuration allows for the least amount of force to be exerted in order to hold the block above the given surface, i.e. to pick up and manipulate a block of this invention. In contrast, FIG. 7 illustrates the forces exerted on the outside surfaces of a conventional block which are the result of a normal force being exerted upon the block (for example as shown in FIG. 5) by creating a frictional force which works partially against the weight force. Such a normal force must by its very nature be greater, and likely more challenging for a human to create, than the forces exerted underneath the frame member in order to hold the given member above a surface. Creation and maintenance of such gripping forces is much more difficult to accomplish than with blocks having the improved features described above.

FIG. 8 discloses further means for enhancing the grip and manipulation of blocks for challenged users. Block 63 comprises an improved surface application placed on the external frame member surfaces 68. In the embodiment shown, the improved surface application comprises hook and loop type of material 72. It is recognized that materials other than hook and loop material 72 may be used to achieve the enhancements described above, for example, a metal surface, a low tack substance, felt or cloth or similar material, magnetic materials, and other materials. Material 72 allows the users to more readily stack blocks and to maintain block structures built by the user during the contact period of the user with the blocks. Prior known blocks and block systems failed to provide such enhancement, causing considerable frustration and ultimate avoidance of such potentially educational stimulation. The many inventive features of the present invention dramatically alters the nature of the user interaction with the new blocks, creating exceptionally positive experiences where none previously existed.

FIG. 9 is a section view of a representative block of the invention illustrating a groove 22 and a lip 24, as shown in FIG. 1. It is recognized that a groove, lip and/or other gripping enhancement means may be placed on one or more portions of a ledge or other parts of a block. It is also recognized that a block of the invention may be made from a variety of materials, and may have a unitary or multi-part construction.

Referring again to FIG. 1, blocks 18 and 20 are shown with translucent elements 32 juxtaposed. Using the blocks of this invention, with translucent elements 32 of different colors, it is possible to create a color effect which is different to the viewer than either of the individual colors in each element. This feature further enhances the educational stimulation value of these blocks, as well as delighting the user.

It will be appreciated by persons skilled in the art that the present invention is not limited by what has particularly been shown heretofore. The various shapes that are possible using the same basic components as have been used in this invention and other configurations of the blocks are possible other than those disclosed above.

I claim:

1. An educational play block for grasping by a user's hand, the hand with a distal phalanx portion length, comprising:

a) an interior member;

b) a peripheral member surrounding and affixed to the interior member, the peripheral member with an interior surface, an outer circumference and at least one exterior surface, the distance between the interior member and the exterior surface defining at least one ledge, the distance between the interior member and the exterior surface further defining a ledge width, the distance between the interior surface and the outer circumference defining a ledge height, the ledge width ergonometrically proportioned such that the distal phalanx portion length is accommodated when the block is grasped by the user; and c) means for enhanced gripping disposed on the at least one ledge.

2. The play block of claim 1, in which the interior member is translucent.

3. The play block of claim 1, in which the interior member further comprises a diffraction grating disposed on at least one surface of the interior member.

4. The play block of claim 2, in which the interior member displays a visually discernable spectral color.

5. The play block of claim 1, in which the peripheral member has two ledges.

6. The play block of claim 1 in which the ledge height of the peripheral member is ergonometrically proportioned such that the distal phalanx portion length is accommodated when the block is grasped by the user.

7. The play block of claim 1, in which the gripping means comprises at least one groove, at least one lip, a hook type material, a loop type of material or any combination thereof.

8. The play block of claim 1, further comprising means for exterior gripping.

9. The play block of claim 8, in which the exterior gripping means comprises a hook type material or a loop type of material, and in which the exterior gripping means is disposed on at least a portion of the exterior periphery.

10. An assemblage of educational play blocks for grasping by a user's hand, the hand with a distal phalanx portion length, comprising:

a plurality of play blocks, each block further including,
an interior member, the interior member displaying a visually discernable spectral color, a peripheral member surrounding and affixed to the interior member, the peripheral member with an interior surface, an outer circumference and at least one exterior surface, the distance between the interior member and the exterior surface defining at least one ledge, the distance between the interior member and the exterior surface further defining a ledge width, the distance between the interior surface and the outer circumference defining a ledge height, the ledge width ergonometrically proportioned such that the distal phalanx portion length is accommodated when the block is grasped by the user, and
means for enhanced gripping disposed on the at least one ledge.

11. The assemblage of claim 10, in which a third visually discernable spectral color is displayed when two interior members are aligned in a generally perpendicular orientation to a light source, the third color not that of either interior member.

12. The assemblage of claim 10, in which the ledge height of the peripheral member is ergonometrically proportioned such that the distal phalanx portion length is accommodated when the block is grasped by the user.

13. The assemblage of claim 10, in which the gripping means comprises at least one groove, at least one lip, a hook type material, a loop type of material or any combination thereof.

14. The assemblage of claim 10, further comprising means for exterior gripping.

15. The assemblage of claim 14, in which the exterior gripping means comprises a hook type material or a loop type of material, and in which the exterior gripping means is disposed on at least a portion of the exterior periphery.

\* \* \* \* \*